United States Patent
Carlino et al.

(10) Patent No.: US 7,403,015 B2
(45) Date of Patent: Jul. 22, 2008

(54) SYSTEM FOR WIRELESS MONITORING OF CIRCUIT BREAKERS

(75) Inventors: Harry J. Carlino, Export, PA (US);
 Todd M. Shaak, Presto, PA (US)

(73) Assignee: Eaton Corporation, Cleveland, OH (US)

( * ) Notice: Subject to any disclaimer, the term of this patent is extended or adjusted under 35 U.S.C. 154(b) by 391 days.

(21) Appl. No.: 11/054,174

(22) Filed: Feb. 9, 2005

(65) Prior Publication Data

US 2006/0176630 A1 Aug. 10, 2006

(51) Int. Cl.
 *G01R 31/02* (2006.01)
(52) U.S. Cl. .............................. 324/424; 361/85; 361/87
(58) Field of Classification Search ................. 324/424; 361/64, 66, 85, 87
 See application file for complete search history.

(56) References Cited

U.S. PATENT DOCUMENTS

| | | | | |
|---|---|---|---|---|
| 5,596,473 A | * | 1/1997 | Johnson et al. | 361/97 |
| 5,859,596 A | * | 1/1999 | McRae | 340/870.02 |
| 5,875,087 A | * | 2/1999 | Spencer et al. | 361/87 |
| 6,005,757 A | * | 12/1999 | Shvach et al. | 361/64 |
| 6,140,897 A | | 10/2000 | Mueller et al. | |
| 6,747,534 B1 | | 6/2004 | Mueller et al. | |
| 6,798,209 B2 | * | 9/2004 | Lavoie et al. | 324/424 |
| 2006/0087783 A1 | * | 4/2006 | Holley | 361/81 |

* cited by examiner

*Primary Examiner*—Vincent Q Nguyen
(74) *Attorney, Agent, or Firm*—Martin J. Moran

(57) ABSTRACT

A system for monitoring a circuit breaker that includes a monitoring device in electronic communication with the circuit breaker and a receiving device located separately from the monitoring device. The monitoring device receives data from the circuit breaker and wirelessly transmits at least a portion of the data such as one or more phase currents measured from a network which the circuit breaker protects, an ambient temperature within the circuit breaker, and/or data relating to a trip condition of the circuit breaker. The receiving device receives the transmitted data and displays all or a portion thereof. The monitoring device also includes a display that displays all or a portion of the data.

14 Claims, 3 Drawing Sheets

SYSTEM FOR WIRELESS MONITORING OF CIRCUIT BREAKERS

BACKGROUND OF THE INVENTION

1. Field of the Invention

The present invention relates to circuit interrupters and in particular to a system for monitoring a circuit breaker wherein data is collected and wirelessly communicated to a separately located receiving device.

2. Background Information

Molded case circuit breakers are well known in the art as exemplified by U.S. Pat. Nos. 6,747,534 and 6,140,897, owned by the assignee hereof, the disclosures of which are incorporated herein by reference. Molded case circuit breakers include a set of separable main contacts, one of which is usually fixed and one of which is movable for automatically opening upon the occurrence of an overload or short circuit electrical current in the network which the circuit breaker is provided to protect. In addition, electronic molded case circuit breakers have trip units, which are often removeably insertable in the circuit breaker case. A trip unit includes a microprocessor, such as a microcontroller, and is adapted to automatically open the circuit breaker contacts under certain conditions. One such condition is what is known as short tripping of the circuit breaker, and occurs when the amount of current flowing through the separable main contacts of the circuit breaker is so high as to represent a potential catastrophic failure and which therefore requires exceedingly quick opening action of the circuit breaker. A second condition is what is known as long tripping, and occurs in response to a relatively low amount of overload current, which eventually will cause overheating of the electrical wires in the circuit to be protected, but which does not necessitate the instantaneous action a short circuit requires and thus does not require the magnetic tripping described above. In either case, one or more current transducers measure the current flowing through the breaker, and the measured currents are provided to the trip unit microprocessor. Algorithms executed by the microprocessor analyze the measured currents and, when a short trip or long trip condition is detected, the microprocessor causes an actuator to open the contacts and thus trip the breaker. Other types of tripping conditions are also known in the art, such as ground fault tripping and over temperature tripping.

Furthermore, it is desirable to be able to monitor certain conditions of a circuit breaker such as a molded case circuit breaker during operation. Such conditions may include, without limitation, causes of trips, breaker temperature, and phase current magnitudes. Typically, a number of molded case circuit breakers, such as 16 or more, are mounted in a single panel. In such situations, it is cost prohibitive and an inefficient use of space to run wires from the breakers to a central location on the panel or elsewhere to transfer the monitored data for subsequent use. Thus, there is a need for a relatively inexpensive and efficient device and system for monitoring certain breaker conditions.

SUMMARY OF THE INVENTION

These needs, and others, are addressed by the present invention which provides a system for monitoring a circuit breaker that includes a monitoring device in electronic communication with the circuit breaker and a receiving device located separately from the monitoring device. The monitoring device receives data from the circuit breaker and, using a first wireless communications device, wirelessly transmits at least a portion of the data, such as one or more phase currents measured from a network which the circuit breaker protects, an ambient temperature within the circuit breaker, and/or data relating to a trip condition of the circuit breaker. The receiving device has a second wireless communications device that receives the transmitted data, and preferably a display for displaying the data that is received. The monitoring device preferably includes a display that displays all or a portion of the data, such as one or more phase currents measured from a network which the circuit breaker protects, an ambient temperature within the circuit breaker, and/or data relating to a trip condition of the circuit breaker. In one embodiment, the ambient temperature is displayed only if it exceeds a predetermined threshold temperature level. In another particular embodiment, the monitoring device wirelessly transmits data only after the circuit breaker moves to a tripped condition.

In the preferred embodiment, the circuit breaker includes a source of power, such as a chopper power supply, and the monitoring device includes a rechargeable battery.

The monitoring device in this embodiment selectively draws power from either the source of power or the rechargeable battery. Specifically, the monitoring device draws power from the source of power when the circuit breaker is in a closed condition, and the monitoring device draws power from the rechargeable battery when the circuit breaker is in a tripped condition. The source of power is used to charge the rechargeable battery so that it will be ready when needed.

The system of the present invention may be used to monitor a number of circuit breakers. Each of the circuit breakers in such as case is in electronic communication with and sends data to a corresponding monitoring device, which in turn transmits data to a single receiving device.

The invention also relates to a method of monitoring a circuit breaker, receiving data from the circuit breaker at a first location proximate to the circuit breaker, wirelessly transmitting at least a portion of the data, and wirelessly receiving the transmitted data at a second location that is separate from the first location. The method further includes performing at least one of: (i) displaying at least a portion of the received data at the second location, and (ii) displaying at least a portion of the collected data at the first location. The data displayed may include, among other things, one or more of one or more phase currents measured from a network which the circuit breaker protects, an ambient temperature within the circuit breaker, and/or data relating to a trip condition of the circuit breaker.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
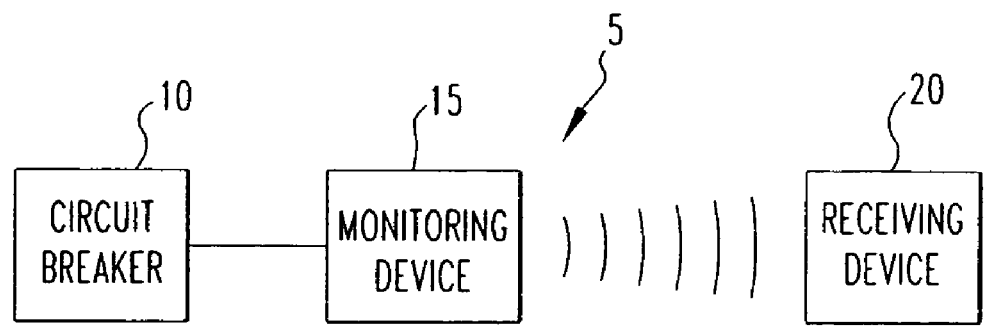
FIG. 1 is a block diagram of a monitoring system according to one embodiment of the present invention.

FIG. 1 is a block diagram of a monitoring system 5 according to the present invention. System 5 includes circuit breaker 10, which may be a molded case circuit breaker or another known type of circuit breaker, in electronic communication with monitoring device 15. System 5 further includes receiving device 20 located separately from circuit breaker 10 and monitoring device 15. As described in greater detail below, monitoring device 15 collects data relating to certain conditions of circuit breaker 10 and/or the network it protects and displays and/or wirelessly transmits such data to receiving device 20. Receiving device 20 stores the data received from monitoring device 15 and automatically or upon request displays relevant portions of the data on a display such as an LCD. While for clarity of disclosure reference has been made herein to an LCD for displaying various types of data, it will be appreciated that such data may be stored, printed on hard copy, be computer modified, or be combined with other data, and all such processing shall be deemed to fall within the terms "display" or "displaying" as employed herein.

Figure 2:
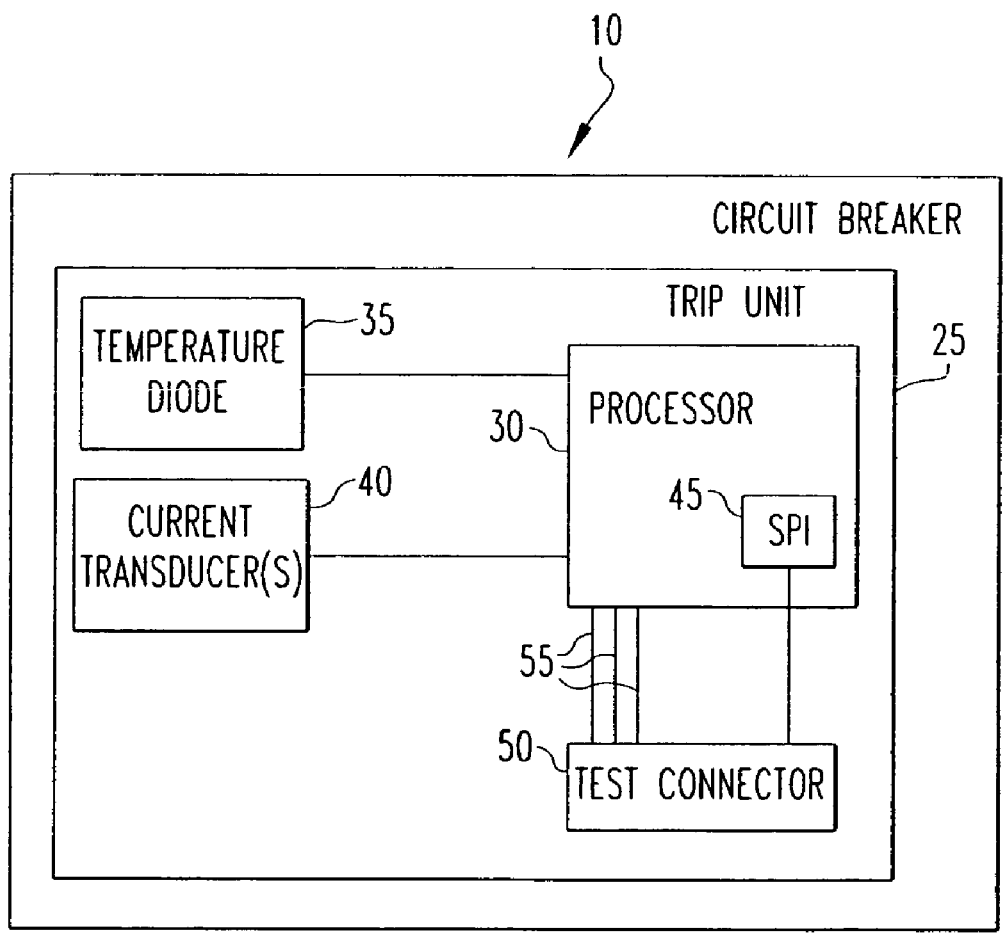
FIG. 2 is a block diagram showing certain relevant components of the circuit breaker forming part of the system shown in FIG. 1.

FIG. 2 is a block diagram showing certain relevant components of the circuit breaker 10 of FIG. 1. In the preferred embodiment, circuit breaker 10 is a molded case circuit breaker, although it will be appreciated that other types of circuit breakers may be utilized within the scope of the present invention. Circuit breaker 10 includes trip unit 25. Trip unit 25 includes processor 30, which may be, without limitation, a microprocessor such as a microcontroller. Trip unit 25 is adapted to open the separable contacts (not shown) of circuit breaker 10 under certain predetermined conditions, such as magnetic (short) tripping, thermal (long) tripping, ground fault tripping, and over temperature tripping conditions. Furthermore, trip unit 25 includes temperature diode 35 or the like that is in electronic communication with processor 30 for measuring the ambient temperature inside trip unit 25. Temperature diode 35 may, alternatively, be part of processor 30. Trip unit 25 also includes one of more current transducers 40 in electronic communication with processor 30 for measuring phase current magnitudes of the network circuit breaker 10 is protecting (could include one or more phases). Processor 30 is provided with SPI (serial port interface) 45 for serially outputting data collected and/or stored by trip unit 25. This data may include, without limitation, the temperature data measured by temperature diode 35 and the phase current data measured by current transducer(s) 40. Such data may also include any other data that is stored in the memory (not shown) of trip unit 25, such as data relating to the switch and other settings of circuit breaker 10.

Trip unit 25 includes test connector 50, which provides an interface for data communication with separate devices, such as monitoring device 15. As seen in FIG. 2, test connector 50 is in electronic communication with SPI 45 for receipt of the data output thereby. In addition, I/O lines 55 connect processor 30 to test connector 50. I/O lines 55 are used to transmit information relating to the trip state or condition of circuit breaker 10. In particular, in the preferred embodiment, two I/O lines 55 are used to encode the following breaker trip conditions: (1) breaker closed and operating properly; (2) magnetic (short) trip; (3) thermal (long) trip; (4) ground fault trip (if circuit breaker is adapted for such a trip); and (5) over temperature trip. The third I/O line 55 is used to latch the trip data into monitoring device 15 (described below) when circuit breaker 10 trips or is opened. As will be appreciated, it is preferable to use I/O lines 55 to transmit trip condition data due to the speed at which such data must be transmitted (power will be quickly lost when a trip occurs, and as described below, monitoring device 15 must quickly switch to back-up power source).

Figure 3:
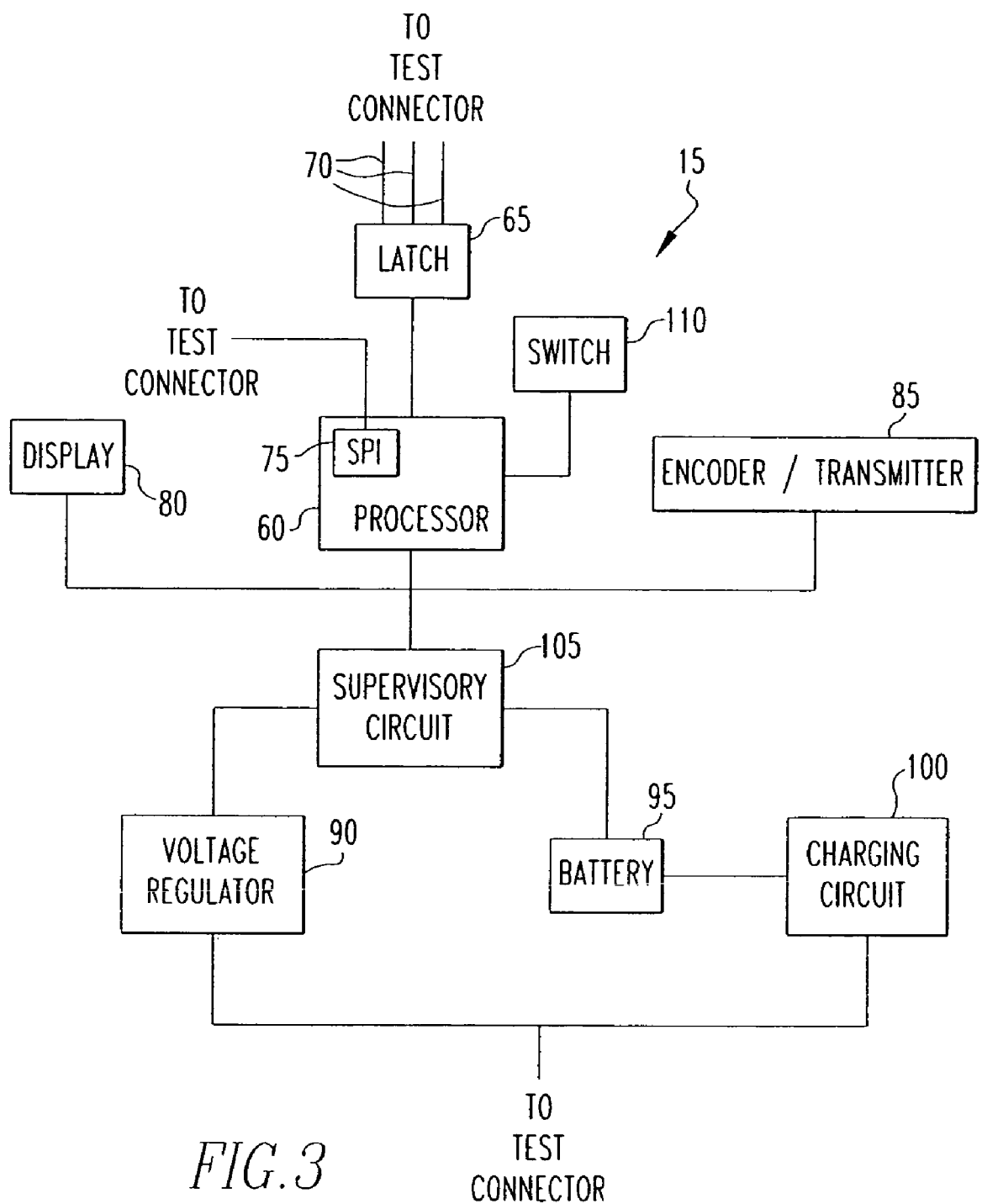
FIG. 3 is a block diagram showing certain relevant components of the monitoring device forming part of the system shown in FIG. 1.

FIG. 3 is a block diagram showing certain relevant components of the monitoring device 15 of FIG. 1. Monitoring device 15 includes processor 60, which may be, without limitation, a microprocessor such as a PIC or other type of microcontroller. Monitoring device 15 is adapted to be selectively placed into electronic communication with circuit breaker 10 through test connector 50 by known methods in order to receive data from circuit breaker 10. In particular, monitoring device 15 further includes latch 65 or the like that is in electronic communication with processor 60. I/O lines 70 are coupled to latch 65 and are provided for receiving the data carried by I/O lines 55 (breaker trip condition data) through test connector 50. That data is then transmitted to processor 60 for processing as described herein. In addition, processor 60 includes SPI 75 for receiving the data output by SPI 45 of processor 30 of circuit breaker 10 through test connector 50. In one embodiment, trip unit 25 is adapted to output via SPI 45 the entire data contents of its memory (not shown), and processor 60 is adapted to select therefrom the data that is of interest (e.g., the phase current and/or temperature data).

Monitoring device 15 further includes display 80 in electronic communication with processor 60. Display 80, which preferably is an LCD (but may be any other type of display device), displays certain data relating to circuit breaker 10 and/or the network it protects that is received by monitoring device 15. Specifically, display 80 is adapted to display the phase current and/or temperature data that are received by SPI 75 through test connector 50. Display 80 may, in one embodiment, continuously and sequentially display the phase current and/or temperature data, one piece of data after another. Alternatively, display 80 may display single pieces of such data (such as a single phase current magnitude) one at a time, only advancing to the next piece of data upon request (such as in response to a button (not shown) provided as part of monitoring device 15). As yet another alternative, processor 30 may be provided with a predetermined threshold temperature level, wherein temperature data is only displayed by display 80 of the measured temperature exceeds the threshold level (with the phase current data being displayed in a manner described above). In addition, display 80 is further adapted to display the breaker condition data that is received via I/O lines 70. Preferably, such data is immediately displayed on display 80 when a trip condition occurs (e.g., a message such as magnetic trip, thermal trip, ground fault trip or over temperature trip is displayed).

In addition, as seen in FIG. 3, monitoring device 15 also includes encoder/transmitter 85, which may be any type of wireless communications device. According to an aspect of the present invention, when a trip occurs, the breaker trip condition data that is received via I/O lines 70 is also provided to encoder/transmitter 85, which in turn transmits the data wirelessly to receiving device 20. In addition, the data that is received by SPI 75 through test connector 50 may also be provided to encoder/transmitter 85 and transmitted wirelessly to receiving device 20 at the same time. Encoder/transmitter 85 may use any of several known methods and protocols for wirelessly transmitting data, such as, without limitation, amplitude shift keying (ASK), Zigbee, Bluetooth, and 802.15.4.

Power for monitoring device 15 is provided in one of two ways when monitoring device 15 is connected to circuit breaker 10 through test connector 50. First, when circuit breaker 10 is in a closed condition and has current flowing through it, monitoring device 15 is powered by the approximately 40 volt chopper power supply (not shown) of circuit breaker 10 (which, as is known, is taken parasitically from one of the phase lines to which circuit breaker 10 is connected). Specifically, the approximately 40 volt chopper power supply is connected to test connector 50, which in turn, as shown in FIG. 3, is connected to voltage regulator 90. Voltage regulator 90 is preferably a +5 volt voltage regulator and, using the approximately 40 volt chopper power supply input (or some other power source input), outputs an approximately 5 volt signal that may be used to power the other components of monitoring device 15. Second, as will be appreciated, if circuit breaker 10 is in an open (e.g., tripped) condition, or is in a closed condition with no current flowing through it, the approximately 40 volt chopper power supply will no longer be available. Thus, monitoring device 15 must utilize a second, back-up power source. For this purpose, monitoring device 15 is provided with rechargeable battery 95, such as a lithium polymer or other known type of rechargeable battery, to provide power to the other components of monitoring device 15 when the approximately 40 volt chopper power supply is not available. As seen in FIG. 3, rechargeable battery 95 is connected to charging circuit 100, which in turn is connected to the approximately 40 volt chopper power supply through test connector 50. Rechargeable battery 95 is charged by charging circuit 100 whenever circuit breaker 10 is in a closed condition with current flowing (wherein the approximately 40 volt chopper power supply is available) so that rechargeable battery 95 will be charged and ready when needed (when circuit breaker 10 moves to an open condition or moves to a closed condition with no current). Supervisory circuit 105 is connected to both voltage regulator 90 and rechargeable battery 95, and is used to switch between the two as appropriate (based on a signal from processor 60) such that voltage regulator 90 provides power when circuit breaker 10 is in a closed condition with current flowing and battery 95 provides power when circuit breaker 10 is in an open (tripped) condition or a closed condition without current. Finally, addressing switch 110, such as a 4 position selectable switch, is in electronic communication with processor 110, and is used to assign an address, such as a 4-bit address, to monitoring device 15 so that it can be distinguished from other similar monitoring devices by receiving device 20 (as described below, the embodiment shown in FIG. 5 contemplates a system in which multiple monitoring devices 15, each one connected to a respective circuit breaker 10, are able to wirelessly communicate data to receiving device 20).

Figure 4:
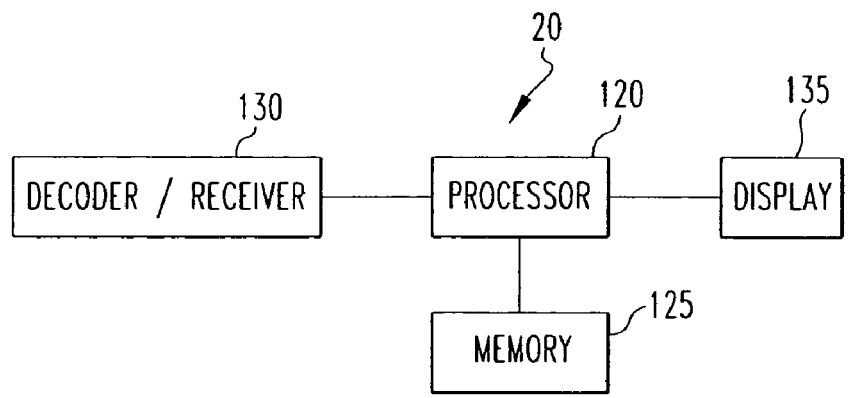
FIG. 4 is a block diagram showing certain relevant components of the receiving device forming part of the system shown in FIG. 1.

FIG. 4 is a block diagram showing certain relevant components of the receiving device 20 shown in FIG. 1. As seen in FIG. 4, receiving device 20 includes processor 120, which may be, without limitation, a microprocessor such as a PIC or other type of microcontroller. Processor 120 is in electronic communication with memory 125 which stores data received by monitoring device 20 and software executable by processor 120 for performing the various functions of monitoring device 20. The memory 125 can be any of a variety of types of internal and/or external storage media such as, without limitation, RAM, ROM, EPROM(s), EEPROM(s), and the like, alone or in combination (and separate from or part of processor 120), that provide a storage register for data storage such as in the fashion of an internal storage area of a computer, and can be volatile memory or nonvolatile memory. Receiving device 20 further includes decoder/receiver 130 that is in electronic communication with processor 120. Decoder/receiver 130 may be any type of wireless communications device that is operatively compatible with encoder/transmitter 85 of monitoring device 15. Decoder/receiver 130 receives and decodes the data that is transmitted by encoder/transmitter 85, and sends the data to processor 120 for processing thereby. Finally, receiving device 20 includes display 135 in electronic communication with processor 120. Display 135, which preferably is an LCD (but may be any other type of display device), is adapted to display selected portions or all of the data relating to circuit breaker 10 that is transmitted by the encoder/transmitter 85 of monitoring device 15 and received by decoder/receiver 130.

Thus, in operation, monitoring device 15 monitors circuit breaker 10 by collecting certain data relating thereto and to the network it protects. Selected portions of the data, such as the temperature data measured by temperature diode 35, the phase current data measured by current transducer(s) 40, and/or the trip related data collected by processor 30, may be displayed on display 80 of monitoring device 15 to be viewed by an operator.

In addition, according to one embodiment of the invention, when circuit breaker 10 is tripped, encoder/transmitter 85 automatically wirelessly transmits the trip related data collected by processor 30 (and optionally any other data that is collected) to receiving device 20. Receiving device 20 then displays the trip related data (and optionally any other data it has received) on display 135 to be viewed by an operator. Alternatively, monitoring device 15 may be adapted to continuously or periodically wirelessly transmit data it has collected, such as the temperature data measured by temperature diode 35, the phase current data measured by current transducer(s) 40, and/or the trip related data collected by processor 30, to receiving device 20 regardless of the trip condition of circuit breaker 10 so that selected portions or all of the data may be stored by memory 125 and/or displayed on display 135. Preferably, receiving device 20 is placed in a location that enables an operator to conveniently access it and view the data displayed on display 135, such as on the exterior of a breaker panel. In addition, receiving device 20 may take the form of an electronic device that is dedicated to the functions described herein, or may be an electronic device having the basic components shown in FIG. 4 that may be used for multiples purposes in addition to the monitoring described herein, such as a PDA, cell phone or laptop computer.

Figure 5:
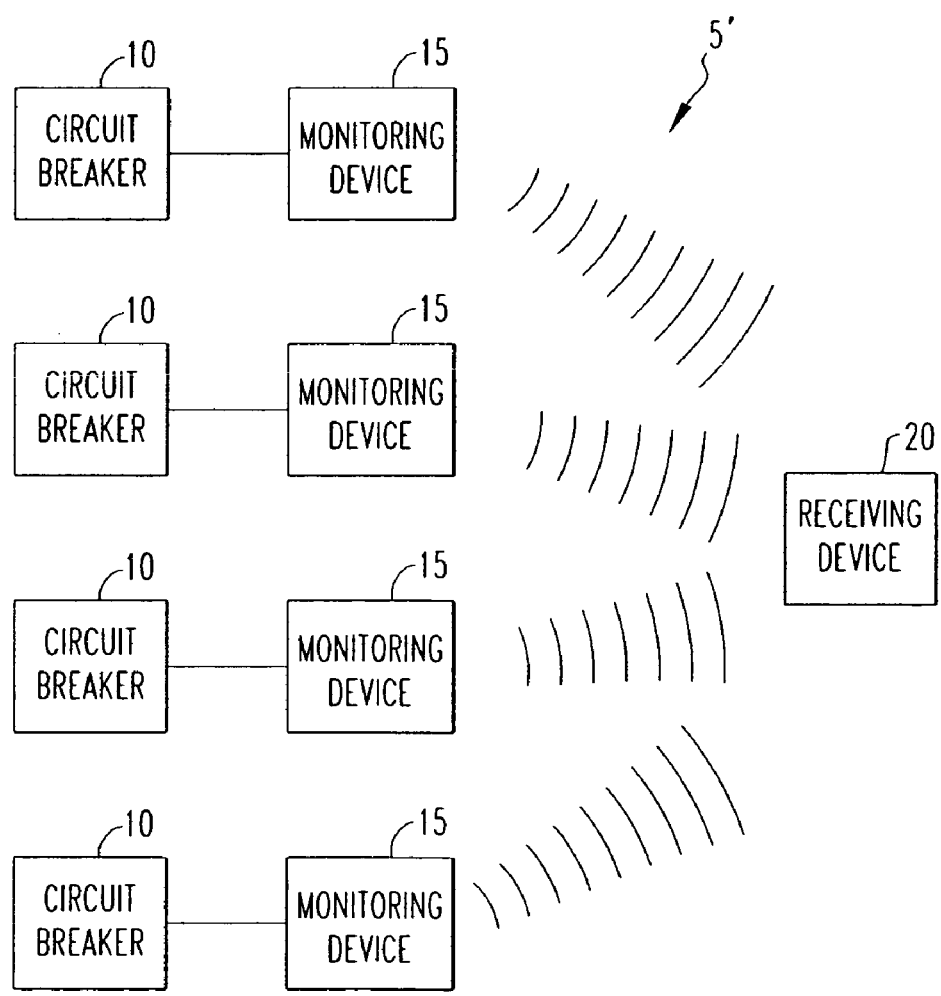
FIG. 5 is a block diagram of a monitoring system according to another embodiment of the present invention.

FIG. 5 is a block diagram showing a system 5' according to one particular embodiment of the present invention. As seen in FIG. 5, system 5' includes multiple circuit breakers 10, such as a number of circuit breakers mounted within a panel in a particular location (as is known, as many as 20-30 circuit breakers 10 may be mounted within a single panel). Each circuit breaker 10 has a corresponding monitoring device 15 operatively coupled thereto as described herein. System 5' also includes a single receiving device 20. Each of the monitoring devices 15 collects data from its corresponding circuit breaker 10 in the manner described herein and displays and/or wirelessly transmits selected portions or all of the collected data to receiving device 20, where it is stored and/or displayed. Each monitoring device 15 in system 5' is programmed with a unique address (using address switch 110 or a similar method) to enable receiving device 20 to identify the particular monitoring device 15 to which each piece of received data corresponds. In addition, receiving device 20 may be provided with a wireless transmitting device (as part of or separate from decoder/receiver 130) that is operatively compatible with encoder/transmitter 85 of monitoring device 15 so that receiving device can selectively request data from particular monitoring devices 15 using the assigned unique addresses thereof While specific embodiments of the invention have been described in detail, it will be appreciated by those skilled in the art of various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system for monitoring a circuit breaker, comprising:
a monitoring device, said monitoring device being in electronic communication with said circuit breaker and receiving data from said circuit breaker, said monitoring device having a first wireless communications device and a display, said first wireless communications device receiving at least a portion of said data and wirelessly transmitting said at least a portion of said data, said display displaying at least a second portion of said data, wherein said circuit breaker measures an ambient temperature within said circuit breaker, wherein said data and said at least a second portion of said data includes said ambient temperature and wherein said ambient temperature is displayed on said display only if said ambient temperature exceeds a predetermined threshold temperature level; and
a receiving device located separately from said monitoring device, said receiving device having a second wireless communications device, said second wireless communications device receiving said at least a portion of said data.

2. The system according to claim 1, wherein said circuit breaker measures one or more phase currents from a network which said circuit breaker protects, and wherein said at least a second portion of said data further includes said one or more phase currents.

3. The system according to claim 1, wherein said circuit breaker measures one or more phase currents from a network which said circuit breaker protects, and wherein said at least a portion of said data includes said one or more phase currents.

4. The system according to claim 1, wherein said at least a portion of said data includes said ambient temperature.

5. The system according to claim 1, wherein said circuit breaker is movable to a plurality of tripped conditions, said circuit breaker generating trip data when said circuit breaker moves to one of said plurality of tripped conditions, and wherein said at least a portion of said data includes said trip data.

6. The system according to claim 5, wherein said monitoring device wirelessly transmits said at least a portion of said data only after said circuit breaker moves to one of said plurality of tripped conditions.

7. The system according to claim 1, wherein said circuit breaker is movable to a plurality of tripped conditions, said circuit breaker generating trip data when said circuit breaker moves to one of said plurality of tripped conditions, and wherein said at least a second portion of said data includes said trip data.

8. The system according to claim 1, wherein said display displays at least a portion of said at least a portion of said data.

9. The system according to claim 1, wherein said circuit breaker includes a trip unit having a microprocessor, said monitoring device being in electronic communication with and receiving said data from said trip unit.

10. The system according to claim 1, wherein said circuit breaker includes a source of power, wherein said monitoring device includes a rechargeable battery, and wherein said monitoring device selectively draws power from either said source of power or said rechargeable battery.

11. The system according to claim 10, wherein said circuit breaker is movable between a closed condition and a tripped condition, wherein said monitoring device draws power from said source of power when said circuit breaker is in said closed condition with current flowing through said circuit breaker, and wherein said monitoring device draws power from said rechargeable battery when said circuit breaker is in either said tripped condition or said closed condition without current flowing through said circuit breaker.

12. The system according to claim 11, wherein said monitoring device automatically shifts from drawing power from said source of power to drawing power from said rechargeable battery when said circuit breaker moves from said closed condition with current flowing through said circuit breaker to either said tripped condition or said closed condition without current flowing through said circuit breaker.

13. The system according to claim 10, wherein said rechargeable battery is electrically connected to said source of power, said source of power charging said rechargeable battery, and wherein said monitoring device includes a voltage regulator electrically connected to said source of power, said monitoring device selectively drawing power from said source of power through said voltage regulator.

14. The system according to claim 1, wherein said system monitors said circuit breaker and a plurality of additional circuit breakers, each of said additional circuit breakers being in electronic communication with and sending additional data to a corresponding one of a plurality of additional monitoring devices each having a corresponding additional first wireless communications device, said corresponding additional first wireless communications device receiving at least a portion of said additional data and wirelessly transmitting said at least a portion of said additional data, wherein said second wireless communications device of said receiving device receives the at least a portion of said additional data transmitted by the additional first wireless communications device of each of said additional monitoring devices.

* * * * *